United States Patent
Zheng et al.

(10) Patent No.: US 12,524,865 B2
(45) Date of Patent: Jan. 13, 2026

(54) METHOD AND APPARATUS FOR DETECTING TAB

(71) Applicant: Contemporary Amperex Technology (Hong Kong) Limited, Hong Kong (CN)

(72) Inventors: Qiuhui Zheng, Ningde (CN); Jun Hu, Ningde (CN); Dajun Ni, Ningde (CN); Shiping Feng, Ningde (CN); Wen Chang, Ningde (CN); Canbin Chen, Ningde (CN); Qing Wu, Ningde (CN); Haoran Lu, Ningde (CN); Yang Lei, Ningde (CN); Baiquan Zhao, Ningde (CN); Pengfei Duan, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 32 days.

(21) Appl. No.: 18/820,499

(22) Filed: Aug. 30, 2024

(65) Prior Publication Data
US 2024/0420307 A1     Dec. 19, 2024

Related U.S. Application Data

(63) Continuation of application No. PCT/CN2022/086174, filed on Apr. 11, 2022.

(51) Int. Cl.
*G06K 9/00* (2022.01)
*G06T 7/00* (2017.01)
(Continued)

(52) U.S. Cl.
CPC .............. *G06T 7/0004* (2013.01); *G06T 7/70* (2017.01); *G06T 2207/30108* (2013.01); *G06T 2207/30242* (2013.01); *H01M 10/04* (2013.01)

(58) Field of Classification Search
CPC ................... G06T 7/0004; G06T 7/70; G06T 2207/30108; G06T 2207/30242;
(Continued)

(56) References Cited

U.S. PATENT DOCUMENTS

| 2020/0152944 A1* | 5/2020 | Sumita | B25J 9/0096 |
| 2021/0296679 A1* | 9/2021 | Chung | H01M 10/0404 |
| 2023/0074096 A1* | 3/2023 | Oh | H01M 50/557 |

FOREIGN PATENT DOCUMENTS

| CN | 108037130 A | 5/2018 |
| CN | 108375544 A | 8/2018 |

(Continued)

OTHER PUBLICATIONS

International Search Report for PCT application No. PCT/CN2022/086174, dated Jul. 22, 2022.
(Continued)

*Primary Examiner* — Gregory A Morse
*Assistant Examiner* — Owais Iqbal Memon
(74) *Attorney, Agent, or Firm* — Ladas & Parry LLP

(57) ABSTRACT

Disclosed are a method and an apparatus for detecting a tab. The method includes: determining that a first tab of a first electrode plate in a plurality of electrode plates of a first electrode assembly reaches a first position in an image collection area, wherein the plurality of electrode plates move toward the image collection area along a vertical direction; and collecting image information of the first tab, wherein the image information of the first tab is used to determine a state of the first tab. The tab detection method provided is able to completely detect the size and shape of the tab while avoiding adverse effects of the detection process on the state of the tab, so that the detection efficiency can be improved while improving the detection effect.

18 Claims, 6 Drawing Sheets

(51) Int. Cl.
*G06T 7/70* (2017.01)
*H01M 10/04* (2006.01)

(58) Field of Classification Search
CPC ............. H01M 10/04; H01M 10/0404; H01M 10/4285; G01B 11/24; G01N 21/8851; G01N 21/89; Y02E 60/10
See application file for complete search history.

(56) References Cited

FOREIGN PATENT DOCUMENTS

| | | |
|---|---|---|
| CN | 110132980 A | 8/2019 |
| CN | 113252698 A | 8/2021 |
| CN | 113376177 A | 9/2021 |
| CN | 113378743 A | 9/2021 |
| JP | 2017126501 A | 7/2017 |
| JP | 2018190508 A | 11/2018 |
| JP | 2020027074 A | 2/2020 |

OTHER PUBLICATIONS

Written Opinion of The International Searching Authority for PCT application No. PCT/CN2022/086174, dated Jul. 22, 2022.
Extended European Search Report for EP application No. 22936777.6, dated Jun. 17, 2025.
Notice of Reasons for Refusal, JP application No. 2024-510718, dated Apr. 8, 2025.
Decision to Grant a Patent dated Aug. 12, 2025 for application JP 2024-510718.

\* cited by examiner

METHOD AND APPARATUS FOR DETECTING TAB

CROSS REFERENCE TO RELATED APPLICATION

This application is a continuation of International Patent Application No. PCT/CN2022/086174, filed on Apr. 11, 2022, which is incorporated by reference in its entirety.

TECHNICAL FIELD

The present application relates to the field of batteries, and more specifically, to a method and an apparatus for detecting a tab.

BACKGROUND

Energy saving and emission reduction are the key to the sustainable development of the automotive industry. In this case, electric vehicles have become an important part of the sustainable development of the automotive industry due to advantages of energy saving and environmental-friendliness. For electric vehicles, battery technology is an important factor related to their development.

In power batteries, the electrode assembly is typically processed through a stacking process. Before stacking, the tabs are usually detected and the corresponding data is stored, so as to avoid a situation in which after the stacking is completed and a battery cell is formed, it is impossible to determine which tab is abnormal when the battery cell has an abnormality, in this case, the whole battery cell needs to be replaced. Therefore, how to perform efficient and high-quality detection on the tabs before stacking is an urgent problem to be solved.

SUMMARY

Embodiments of the present application provide a method and apparatus for detecting a tab, which is capable of completely detecting the size and shape of a tab while avoiding adverse effects of the detection process on the state of the tab, so that the detection efficiency can be improved while improving the detection effect.

In a first aspect, provided is a tab detection method. The method comprises: determining that a first tab of a first electrode plate in a plurality of electrode plates of a first electrode assembly reaches a first position in an image collection area, where the plurality of electrode plates move toward the image collection area along a vertical direction; and collecting image information of the first tab, wherein the image information of the first tab is used to determine a state of the first tab.

In the embodiment of the present application, by collecting image information of a tab that moves along the vertical direction, on the one hand, features such as the size and shape of a tab can be completely detected through collecting image information of the tab, compared with the solution of detecting the tab by using a light sensor, collecting image information of the tab can accurately detect and identify whether the tab is folded, missing, damaged, etc., thereby improving the detection effect of the tab; on the other hand, by collecting image information of a tab when the tab moves to the first position along the vertical direction, unevenness of the tab such as recesses caused by gravity when it moves horizontally can be avoid, thereby avoiding influence of gravity on detection accuracy. In addition, the image information of a tab is collected as soon as it reaches the first position, it is no need to stay in the image collection area, so that image information of a plurality of tabs can be continuously collected, which greatly improves the detection efficiency of tabs.

In some embodiments, determining the first tab of the first electrode assembly reaches the first position comprises: determining that the first tab reaches a second position, where the second position being a start position of the image collection area in the vertical direction; and determining that the first tab reaches the first position when the first tab moves by a first distance along the vertical direction after reaching the second position.

In this embodiment of the present application, by performing image collection on the first tab when it is determined that the first tab moves a first distance after entering the image collection area, it is ensured that the image collection area completely covers the first tab, thereby avoiding incomplete image information collection due to the first tab not completely entering or partially leaving the image collection area, which further improve detection quality and detection efficiency.

In some embodiments, the plurality of electrode plates move toward the image collection area along the vertical direction after passing through a first sensing mechanism, and the determining the first tab reaches the second position comprises: determining the first tab passes through the first sensing mechanism; and determining that the first tab reaches the second position when the first tab moves by a second distance along the vertical direction after passing through the first sensing mechanism.

In this embodiment of the present application, by monitoring whether the first tab reaches the second position through the first sensing mechanism and determining that the first tab reaches the second position when the first tab moves a second distance after passing through the first sensing mechanism, it is possible to easily and accurately determine the moment when the first tab reaches the image collection area, thereby ensuring that the first tab reaches the first position at an accurate moment, and image information thereof is completely and accurately collected.

In some embodiments, the method further includes: counting tabs that pass through the first position; and determining that all image information of the plurality of tabs has been collected when the number of tabs passing through the first position is equal to the number of the plurality of tabs.

In this embodiment of the present application, by counting the tabs that pass through the image collection area and determining whether all the image information of the plurality of tabs of the first electrode assembly has been collected, it is ensured that the image information of the plurality of tabs of the first electrode assembly is continuously collected when the count value does not reach the number of tabs, thereby improving detection efficiency of the tabs.

In some embodiments, the first tab is a first tab of the first electrode assembly; and after determining that the first tab reaches the second position, the method further includes: resetting a count of tabs of a second electrode assembly to zero, where the second electrode assembly is the electrode assembly detected before the first electrode assembly.

In this embodiment of the present application, by resetting the count of tabs of the second electrode assembly to zero when the first tab of the first electrode assembly reaches the second position, that is, resetting the count of tabs of the electrode assembly detected before the first electrode assembly to zero, accurate counting can be ensured when a plurality of tabs of the first electrode assembly is detected, which helps to improve the detection efficiency.

In some embodiments, the method further includes: receiving detection results of the plurality of tabs of the first electrode assembly after all image information of the plurality of tabs of the first electrode assembly has been collected.

In this embodiment of the present application, by receiving the detection results of tabs of entire electrode assembly after it is determined that all the image information of the plurality of tabs of the plurality of electrode plates of the first electrode assembly is completely collected, influence of frequent data transmission on the tab detection can be avoid, so that the image information of the plurality of tabs of the electrode assembly can be collected quickly and continuously, thereby improving detection efficiency.

In some embodiments, the plurality of electrode plates enter a stacking area after passing through the image collection area, and are stacked in the stacking area.

In this embodiment of the present application, the plurality of electrode plates of the first electrode assembly being stacked in the stacking area as soon as they move along the vertical direction and pass through the image collection area, which reduces the risk the tabs being folded during movement after passing through the image collection area and before entering the stacking area, avoids the influence of poor state of tabs on the detection result after the tabs are detected, and improves accuracy of the detection result of the tabs.

In some embodiments, the image information of the plurality of tabs has been collected by at least one CCD (charge coupled device) camera.

In this embodiment of the present application, by collecting the image information of tabs through the CCD camera, which is able to perform high-speed and continuous shooting on the tabs that continuously pass through the image collection area, efficiency and quality of tab detection can be ensured.

In some embodiments, when the first tab reaches the first position, the center of the first tab coincides with the center of the field of view of the CCD camera.

In this embodiment of the present application, by arranging the first position to coincide with the center of the field of view of the CCD camera, the completeness and clarity of the image information of tabs can be further improved, which helps to improve the detection quality.

According to a second aspect, a tab detection apparatus is provided. The apparatus includes: a processing unit, configured to determine that a first tab of a first electrode plate in a plurality of electrode plates of a first electrode assembly reaches a first position in an image collection area, where the plurality of electrode plates move toward the image collection area along a vertical direction; and a collection unit, configured to collect image information of the first tab, the image information of the first tab being used to determine a state of the first tab.

In some embodiments, the processing unit is further configured to: determine that the first tab reaches a second position, the second position being a start position of the image collection area in the vertical direction; and determine that the first tab reaches the first position when the first tab moves by a first distance along the vertical direction after reaching the second position.

In some embodiments, the plurality of electrode plates move toward the image collection area along the vertical direction after passing through a first sensing mechanism, and the processing unit is further configured to: determine that the first tab passes through the first sensing mechanism; and determine that the first tab reaches the second position when the first tab moves by a second distance along the vertical direction after passing through the first sensing mechanism.

In some embodiments, the apparatus includes: a counting unit, configured to count tabs passing through the first position; the processing unit is configured to determine that all image information of the plurality of tabs has been collected when the number of tabs that pass through the first position is equal to the number of the plurality of tabs.

In some embodiments, the first tab is a first tab of the first electrode assembly; and after it is determined that the first tab reaches the second position, the counting unit is further configured to reset the count of tabs of a second electrode assembly to zero, where the second electrode assembly is the electrode assembly detected before the first electrode assembly.

In some embodiments, the apparatus further includes: a receiving unit, the receiving unit being configured to receive detection results of the plurality of tabs of the first electrode assembly after all image information of the plurality of tabs of the first electrode assembly has been collected.

In some embodiments, the plurality of electrode plates enter a stacking area after passing through the image collection area, and are stacked in the stacking area.

In some embodiments, the collection unit comprises at least one CCD camera.

In some embodiments, when the first tab reaches the first position, the center of the first tab coincides with the center of the field of view of the CCD camera.

BRIEF DESCRIPTION OF DRAWINGS

In order to illustrate the technical solutions of the embodiments of the present application more clearly, the drawings required in the examples of the present application will be briefly introduced below. Obviously, the drawings described below are only some embodiments of the present application. For those of ordinary skill in the art, other drawings can also be obtained according to the drawings without any creative effort.

DETAILED DESCRIPTION

Figure 1:
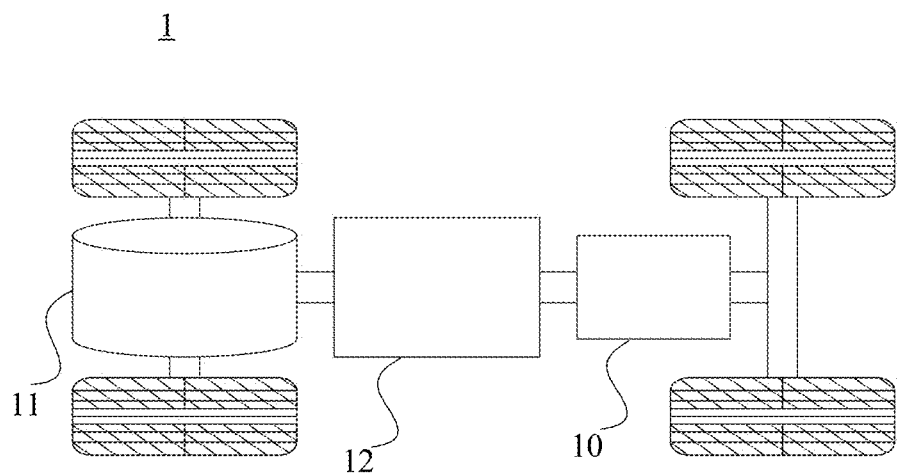
FIG. 1 is a schematic structural diagram of an electrical apparatus according to the present application.

The implementations of the present application are further described in detail in combination with the drawings and the embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second", "third" and so on are used for descriptive purposes only, and cannot be understood to indicate or imply relative importance. "Perpendicular" is not perpendicular in the strict sense, but within the allowable range of error. "Parallel" is not parallel in the strict sense, but within the allowable range of error.

The orientation words appearing in the following description are all the directions shown in the figures, and are not intended to limit the specific structure of the present application. In the description of the present application, it should be further noted that unless otherwise prescribed and defined clearly, terms "mounting", "communicating" and "connection" should be understood in a broad sense, which for example can be a fixed connection and can also be a detachable connection or an integral connection; or can be a direct connection and can also be a connection through an intermediary. For those of ordinary skill in the art, the specific meanings of the above terms in the present application may be understood according to specific circumstances.

In the present application, the term "and/or" is only an association relationship for describing associated objects, indicating that three relationships may exist. For example, A and/or B may represent three situations: A exists, both A and B exist, and B exists. In addition, the character "/" in the present application generally means that the associated objects before and after it are in an "or" relationship.

Unless otherwise defined, all technical and scientific terms used herein have the same meaning as commonly understood by those skilled in the art belonging to the technical field of the present application; the terms used specification of the present application are intended only for the purpose of describing specific embodiments and are not intended to limit the present application; the terms "including" and "having" and any variations thereof in the specification and the claims of the present application and in the description of drawings above are intended to cover non-exclusive inclusion. The terms such as "first" and "second" used in the specification, claims, and brief description of drawings herein are intended to distinguish between different items, but are not intended to describe a specific sequence or order of precedence.

The "embodiment" referred herein means at least one embodiment that can be included in the present application with reference to the specific characteristics, structures or features described in the embodiment. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

In the present application, "a plurality of" means two or more (including two), similarly, "a plurality of groups" means two or more groups (including two groups), and "a plurality of sheets" means two or more sheets (including two sheets), and a plurality of columns means two or more (including two columns).

In the environment of the automobile industry that uses traditional energy as power supply, environmental pollution issues are becoming increasingly serious, and the active development of new energy vehicles can reduce harm to the environment. For new energy vehicles, battery technology is an important factor in the development thereof.

Currently, the manufacturing method of battery cells mainly comprises a winding type and a stacking type. The winding type is to make the positive electrode plate and negative electrode plate into continuous long pieces, they are separated by a separator therebetween, and then they are made into a battery cell by winding. Battery formed by the battery cell has a problem of stress concentration at the bending position of the electrode plates, and long-term accumulation of expansion and contraction of the electrode plates due to charging and discharging may cause deformation of the electrode plates and affect performance of the battery.

The stacking type mainly involves cutting the positive electrode plate and the negative electrode plate into separate pieces, a separator is stacked in a Z-shape, and the positive electrode plates and the negative electrode plates are stacked alternately, they are separated by the separator therebetween. A portion of metal foil that is reserved on the positive electrode plate or the negative electrode plate not being covered with electrode material is the tab. The battery formed in this manner has advantages of small internal resistance, low cycle performance, and the ability of charging and discharging at high rates, etc., which is suitable for use as a power source, and thus receiving more and more attention.

However, before stacking, since the metal foil used as a tab usually has extremely thin thickness and low mechanical strength, it is prone to be folded, damaged, or missing during a conveying process, which is likely to cause problems such as short circuit and low capacity of the assembled battery cell; after stacking is completed and the battery cell is formed, if an abnormality occurs in the battery cell in a subsequent process, for example, a tab in the battery cell is folded, it is necessary to determine which tab has the problem, otherwise, the entire battery cell may need to be replaced, resulting in a high scrap rate of battery cells. Therefore, the tabs are usually detected before stacking to determine whether the parameters of the tabs meet the requirements, which also facilitates subsequent replacement of an electrode plate in which a tab causing abnormality in a battery cell is located.

Currently, an optical sensor is usually used to detect a tab, and a width or a length of the tab is calculated from a time duration that the tab blocks the optical sensor. The detection accuracy of this method is affected by the accuracy of the sensor and the processor, and it is unable to accurately detect tabs with gradually changed width, nor to identify the situation of missing tabs.

In view of this, the present application provides a method and device for detecting a tab, which is capable of completely detecting the size and shape of a tab while avoiding adverse effects of the detection process on the state of the tab, so that the detection efficiency can be improved while improving the detection effect.

As shown in FIG. 1, a schematic structural diagram of vehicle 1 according to the present application is shown. Vehicle 1 may be a fuel vehicle, a gas vehicle, or a new energy vehicle, and the new energy vehicle may be an all-electric vehicle, a hybrid electric vehicle, an extended range electric vehicle, or the like. A motor 11, a controller 12 and a battery 10 may be provided inside the vehicle 1, and the controller 12 is configured to control the battery 10 to supply power to the motor 11. For example, the battery 10 may be arranged at the bottom or the head or the tail of the vehicle 1. The battery 10 may be configured to supply power to the vehicle 1, for example, the battery 10 may be used as an operating power source of the vehicle 1, which is used for a circuit system of the vehicle 1, for example, for operation power requirements of the vehicle 1 during starting, navigation and running. In another embodiment of the present application, the battery 10 can be used not only as the operating power source of the vehicle 1, but also as the driving power source of the vehicle 1 in place of or partially in place of fuel or natural gas to provide driving power for the vehicle 1.

It should be understood that, in the present application, the electrical device being a vehicle is used as an example, but the electrical device may alternatively be a mobile phone, a portable device, a laptop computer, a ship, a spacecraft, an electric toy, an electric tool, and the like. The vehicle may be a fuel vehicle, a gas vehicle or a new energy vehicle. The new energy vehicle may be an all-electric vehicle, a hybrid electric vehicle, an extended-range electric vehicle, or the like. The spacecraft includes airplanes, rockets, space shuttles, spaceships, and the like. The electric toy includes fixed or mobile electric toys, such as game consoles, electric car toys, electric ship toys and electric aircraft toys. The electric tool includes metal cutting electric tools, grinding electric tools, assembly electric tools and railway electric tools, such as electric drills, electric grinders, electric wrenches, electric screwdrivers, electric hammers, impact drills, concrete vibrators and electric planers. The electrical device is not specially limited in the embodiments of the present application.

In the present application, the battery is a physical module including one or more battery cells to provide electrical energy. For example, the battery mentioned in the present application may include a battery module, a battery pack, or the like. The battery generally comprises a box body for encapsulating one or more battery cells. The box body can prevent liquids or other foreign matters from affecting charging or discharging of the battery cells.

In order to meet different power requirements, battery may include a plurality of battery cells, wherein the plurality of battery cells may be in series connection, in parallel connection, or in parallel-series connection, and the parallel-series connection refers to mixing of the series connection and the parallel connection. The battery may also be called a battery pack. Optionally, a plurality of battery cells may be in series, parallel or parallel-series connection to form battery modules first, and then a plurality of battery modules may be in series, parallel or series-parallel connection to form a battery. That is, the plurality of battery cells may directly form a battery, or form battery modules first, and then form a battery by the battery modules.

Figure 2:
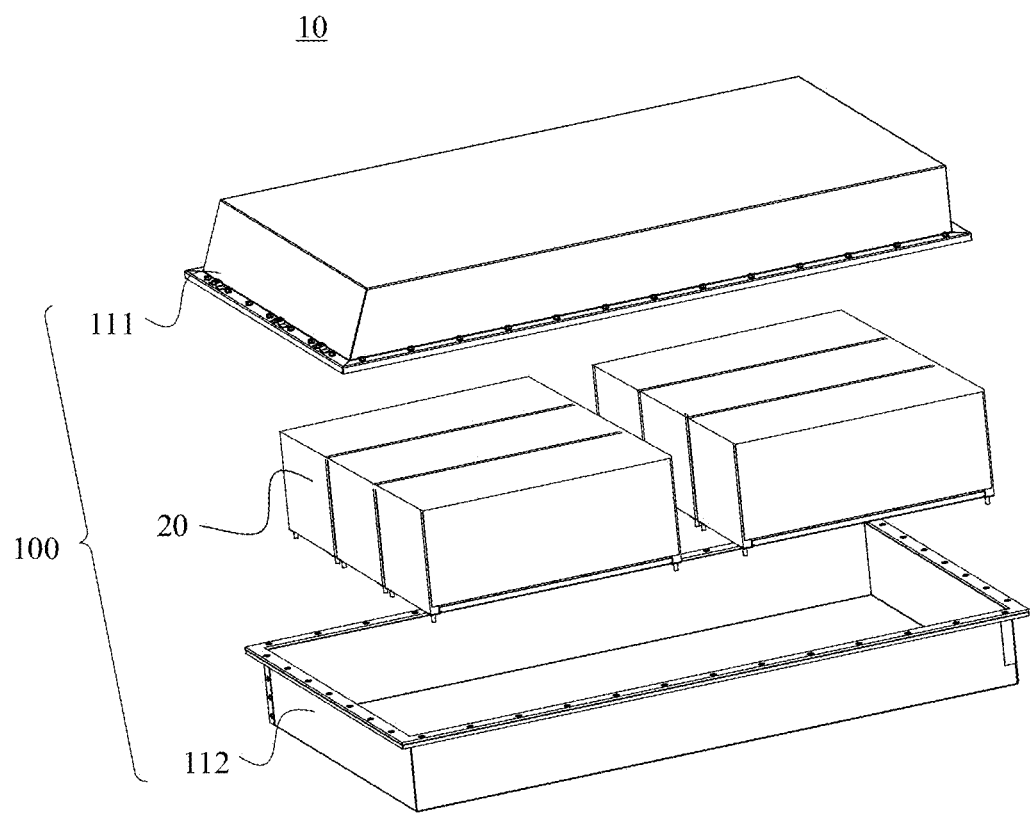
FIG. 2 is a schematic structural diagram of a battery according to the present application.

For example, FIG. 2 is a schematic structural diagram of a battery 10 according to the present application. The battery 10 may include a plurality of battery cells 20. The number of the battery cells 20 may be set to any value. The plurality of battery cells 20 may be in series, parallel or parallel-series connection to obtain larger capacity or power.

Optionally, the battery cell 20 may include a lithium-ion secondary battery, a lithium-ion primary battery, a lithium-sulfur battery, a sodium-lithium-ion battery, a sodium-ion battery, a magnesium-ion battery, or the like, which will not be limited in the embodiments of the present application. In some embodiments, the battery cell 20 may also be referred to as a cell.

The battery cell 20 includes an electrode assembly and an electrolyte solution, and the electrode assembly is composed of a positive electrode plate, a negative electrode plate and a separator. The battery cell operates mainly relying on the movement of metal ions between the positive electrode plate and the negative electrode plate. The positive electrode plate includes a positive electrode current collector and a positive electrode active material layer, the positive electrode active material layer is coated on the surface of the positive electrode current collector, the current collector not coated with the positive electrode active material layer protrudes from the current collector coated with the positive electrode active material layer, and the current collector not coated with the positive electrode active material layer is used as the positive tab. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode plate includes a negative electrode current collector and a negative electrode active material layer, the negative electrode active material layer is coated on the surface of the negative electrode current collector, the current collector not coated with the negative electrode active material layer protrudes from the current collector coated with the negative electrode active material layer, and the current collector not coated with the negative electrode active material layer is used as the negative tab. The material of the negative electrode current collector may be copper, and the negative electrode active material may be carbon, silicon, or the like. In order to ensure that no fusing occurs when a large current passes, there are a plurality of positive tabs which are stacked together, and a plurality of negative tabs which are stacked together. The separator may be made from polypropylene (PP) or polyethylene (PE) or the like. In addition, the electrode assembly may be of a wound structure or a stacked structure, which is not limited in the embodiments of the present application.

The electric box according to the embodiment of the present application further includes a box body, a battery management system, and relevant installation structural members on the basis of the battery 10.

Figure 3:
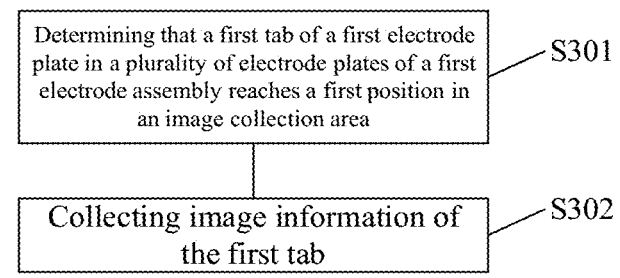
FIG. 3 is a schematic flowchart of a tab detection method according to the present application.

A tab detection method 300 is described below. FIG. 3 is a schematic flowchart of a tab detection method according to an embodiment of the present application; As shown in FIG. 3, the tab detection method 300 includes:

S301: Determine that a first tab of a first electrode plate in a plurality of electrode plates of a first electrode assembly reaches a first position in an image collection area.

S302: Collect image information of a first tab.

wherein the plurality of electrode plates move toward the image collection area along a vertical direction, and the image information of the first tab is used to determine a state of the first tab.

Specifically, the image information of the first tab is collected when it is determined that the first tab reaches the first position, and the image information can be processed and stored by a main control computer. The main control computer processes the image information of the first tab and generates a detection result. The state of the first tab includes the folding degree of the first tab, the size of the first tab, the integrity of the first tab, and so on.

Figure 4:
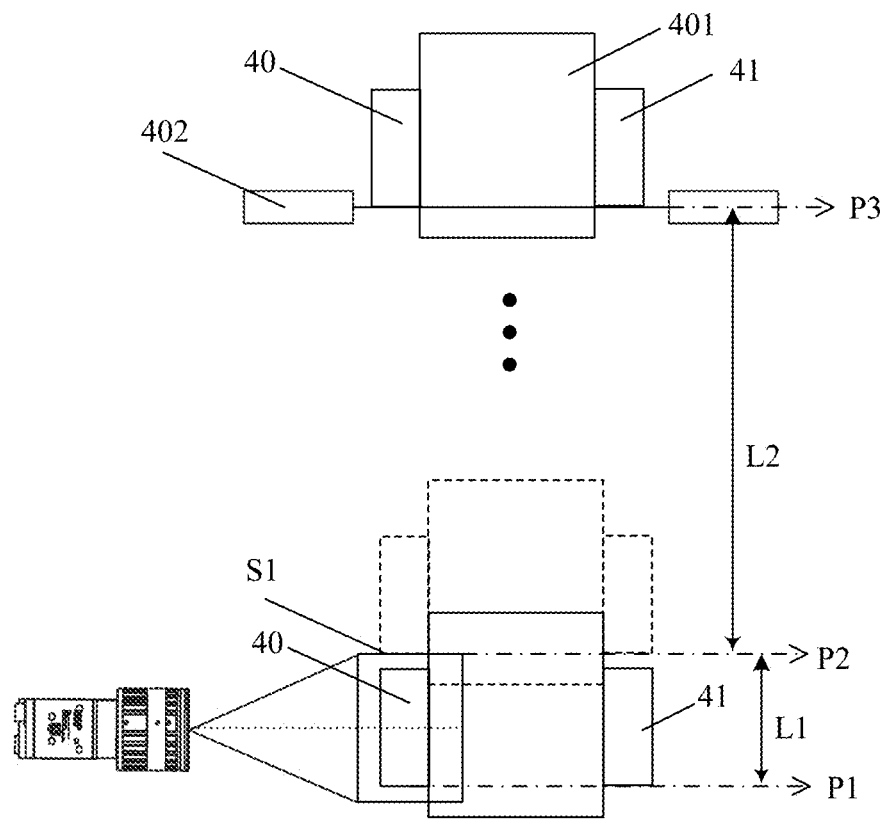
FIG. 4 is a schematic diagram of a tab detection area according to the present application.

FIG. 4 is a schematic diagram of a tab detection area according to an embodiment of the present application; For example, as shown in FIG. 4, the electrode assembly includes a plurality of electrode plates 401, the plurality of electrode plates 401 have a plurality of tabs, and the first tab may refer to any one of the plurality of tabs of the electrode assembly. When a negative tab 40 of an electrode assembly reaches the first position P1 along the vertical direction, the image information of the negative tab 40 is collected, and the first position P1 is located in the image collection area S1.

Figure 6A:
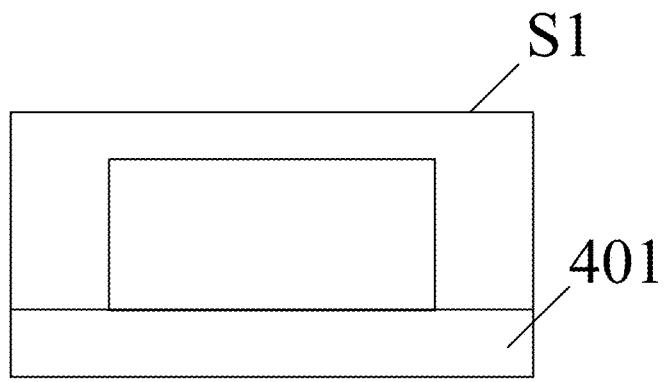
FIG. 6*a* is a schematic diagram of a state of a tab according to the present application.
Figure 6B:
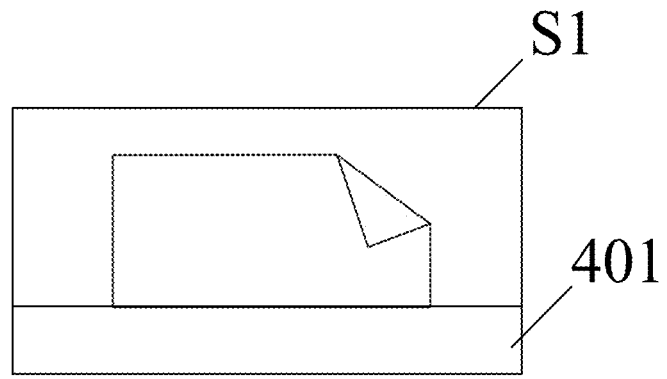
FIG. 6*b* is a schematic diagram of another state of a tab according to the present application.
Figure 6C:
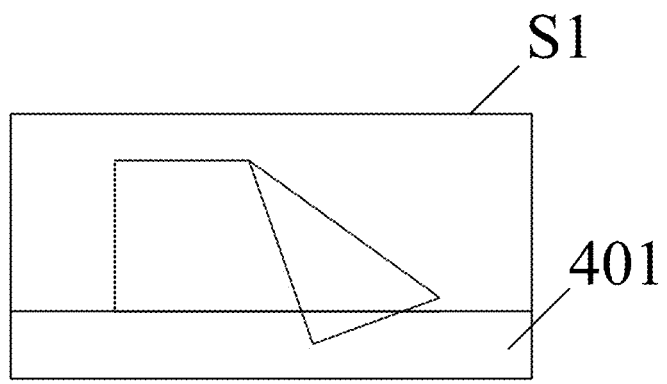
FIG. 6*c* is a schematic diagram of still another state of a tab according to the present application.

FIG. 6a to FIG. 6c are schematic diagrams of several states of tabs according to the embodiments of the present application. FIG. 6a shows a normal state of a tab, the tab is not folded or damaged in the normal state; FIG. 6b shows a state in which the tab is partially folded, where the partially fold means that the tab is folded but not folded to the side with opposite polarity thereof, in this case, although the tab is folded, the influence on the subsequent assembly of a battery cell is not large, which will not cause short circuit of the battery cell; FIG. 6c shows a state in which the tab is fully folded, where the fully folded means that the tab is folded to the side with opposite polarity thereof, in this case, after the battery cell is assembled, it is equivalent to a part of a positive electrode is short-circuited with a negative electrode, which will cause short-circuit of the battery cell and thus causes safety problems.

In this embodiment, firstly, the tab of the first electrode assembly entering the image collection area along the vertical direction, wherein the image collection area being arranged in the vertical direction, which can avoid recesses and unevenness of the tab due to gravity when the tab moves along the horizontal direction or other directions, so that deviation in parameters of the tab during detection can be avoid, in this way, the accuracy of the detection result can be improved; secondly, compared with the solution of detecting tabs by an optical sensor, the state of the first tab being determined by collecting image information, where the parameters such as the size, shape, and whether the tab is folded can be reflected accurately through the image information, so that whether the tab is folded, missing or damaged can be detected and identified quickly and accurately, thereby improving the tab detection effect; finally, the image information being collected as soon as the first tab reaches the first position, in this way, the first tab does not need to stay in the image collection area, so that the image information collection process of a plurality of tabs of the first electrode assembly can be continuously performed, thereby improving detection efficiency.

Figure 5:
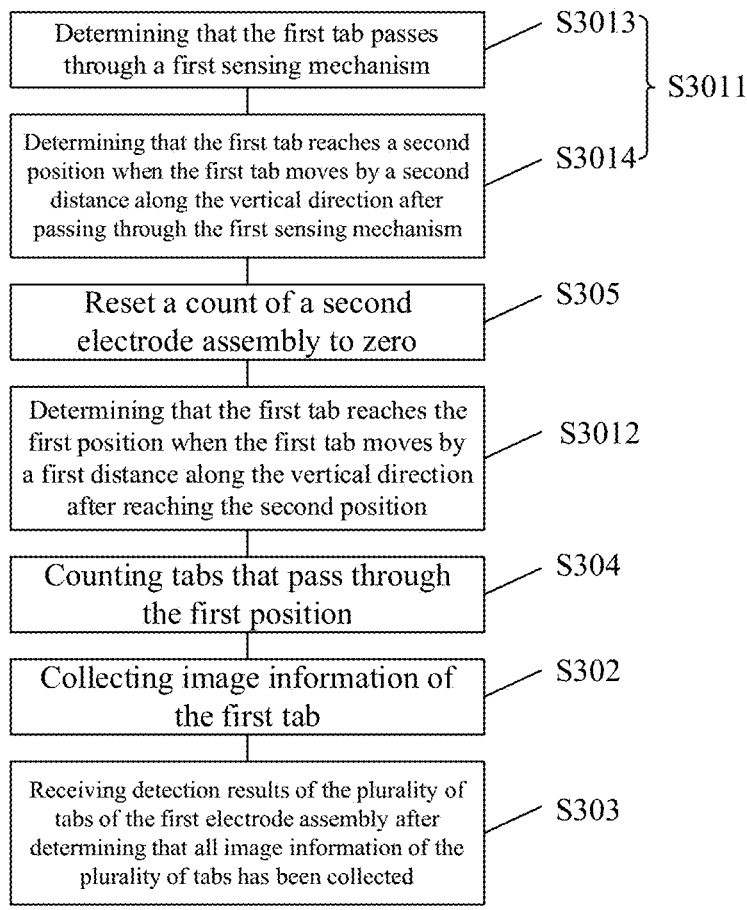
FIG. 5 is a schematic flowchart of another tab detection method according to the present application.

FIG. 5 is a schematic flowchart of another tab detection method according to an embodiment of the present application.

Optionally, as shown in FIG. 5, the method 300 further includes: S303, receive detection results of a plurality of tabs of the first electrode assembly after all image information of the plurality of tabs of the first electrode assembly has been collected.

Specifically, after it is determined that the all images of the plurality of tabs of the first electrode assembly are collected, detection results of the tabs of the entire first electrode assembly sent by a main control computer is received, so that it is possible to determine the status of each tab of the first electrode assembly based on the detection result, and determine whether further actions such as stopping the detection or adjusting tabs of the first electrode assembly are required.

Exemplarily, please continue to refer to FIG. 4, the electrode assembly includes N electrode plates 401, and the N electrode plates 401 include N negative tabs 40 and N positive tabs 41. For example, the detection results of N negative tabs 40 of the electrode assembly may be received after all the images of N negative tabs 40 of the electrode assembly are collected. For another example, the detection results of N positive tabs 41 of the electrode assembly may be received after all the images of N positive tabs 41 of the electrode assembly are collected. For still another example, the detection results of N positive tabs 41 and N negative tabs 40 of the electrode assembly may be received after all the images of N positive tabs 41 and N negative tabs 40 of the electrode assembly are collected, wherein N is a positive integer.

In this embodiment, by using the method in which the detection results of the plurality of tabs of the entire electrode assembly being received after the plurality of tabs of the entire electrode assembly are detected, rather than performing data transmission every time when a tab is detected and detecting next tab after detection result of each tab is received, the influence of frequent data transmission on the detection efficiency of tabs can be effectively avoided, so that the image information of the plurality of tabs of the electrode assembly can be collected quickly and continuously, thereby improving detection efficiency of tabs.

Optionally, as shown in FIG. 5, in S301, determining that the first tab of the first electrode assembly reaches the first position comprises:

S3011: Determine that the first tab reaches the second position, the second position being a start position of the image collection area in the vertical direction;

S3012: Determine that the first tab reaches the first position when the first tab moves by a first distance along the vertical direction after reaching the second position.

Specifically, when the first tab reaches the start position of the image collection area, i.e., the second position, the movement distance of the first tab is fed back, the first tab reaches the first position when the first tab moves a first distance after passing through the second position, and the image information of the first tab is collected at this time.

Please continue to refer to FIG. 4, when a negative tab 40 of the electrode assembly reaches the second position P2 along the vertical direction, the movement distance of the negative tab 40 is monitored, it is determined that the negative tab 40 reaches the first position P1 when the negative tab 40 moves a first distance L1 along the vertical direction, and the image information of the negative tab 40 is collected at this time.

In this embodiment, whether the first tab reaches the first position is determined by monitoring a movement distance of the first tab after it enters the image collection area, which helps to complete collection of the image information of the first tab, so that the image collection area completely covers the first tab, thereby avoiding incomplete image information collection due to the first tab not completely entering or partially leaving the image collection area, which further improve detection quality and detection efficiency.

Optionally, as shown in FIG. 5, in S3011: Determine that the first tab reaches the second position comprises:

S3013: Determine that the first tab passes through a first sensing mechanism;

S3014: Determine that the first tab reaches the second position when the first tab moves by a second distance along the vertical direction after passing through the first sensing mechanism.

Specifically, when the plurality of electrode plates of the first electrode assembly move in the tab detection area along the vertical direction, they pass through the first sensing mechanism first, where the first sensing mechanism being able to sense the position of the tabs in real time. By monitoring the position of the first tab after it is determined that the first tab passes through the first sensing mechanism, when the first tab moves a second distance after passing through the first sensing mechanism, it can be determined that the first tab reaches the second position.

In an example, referring to FIG. 4, when the negative tab 40 of the electrode assembly passes through the first sensing mechanism 402, it can be sensed by the first sensing mechanism 402. Once the negative tab 40 being sensed by the first sensing mechanism 402, it is considered that the negative tab 40 reaches the vertical position of the first sensing mechanism 402, that is, the third position P3. It is determined that the negative tab 40 reaches the second position P2 when the negative tab 40 moves a second distance L2 along the vertical direction after passing through the third position P3. It should be understood that the first sensing mechanism 402 may be a transmission mechanism with a sensing function, or may be a sensing mechanism such as an optical sensor, which is not limited in the embodiment of the present application.

In this embodiment, by monitoring the position of the first tab through the first sensing mechanism and determining that the first tab reaches the second position when the first tab moves a second distance after passing through the first sensing mechanism, the moment that the first tab reaches the start position of the image collection area can be accurately and efficiently determined, thereby determining the moment at which the first tab reaches the shooting position, and ensuring that the image of the first tab is clearly and completely collected.

Optionally, as shown in FIG. 5, before it is determined that all image information of the plurality of tabs has been collected, the method 300 further includes: S304. Count the tabs that pass through the first position.

Specifically, by counting the tabs that pass through the first position, the number of tabs of which the image information has been collected can be determined. When the count of tabs reaches the number of the plurality of tabs of the first electrode assembly, it means that all the image information of the plurality of tabs of the first electrode assembly has been collected.

In an example, please continue to refer to FIG. 4, the electrode assembly includes N negative tabs 40 and N positive tabs 41, and the number of the negative tabs 40 or the positive tabs 41 that pass through the first position P1 is counted. When the count reaches N, it is determined that all the image information of N negative tabs 40 or N positive tabs 41 of the electrode assembly is collected. For another example, by counting the number of the negative tabs 40 and the positive tabs 41 that pass through the first position P1, when the count reaches 2N, it is determined that all the image information of N negative tabs 40 and N positive tabs 41 of the electrode assembly is collected.

In this embodiment, whether all the image information of the plurality of tabs of the first electrode assembly has been collected is determined by counting the tabs that pass through the first position, so that it is possible to easily and efficiently determine whether the image information collection of the plurality of tabs of the first electrode assembly is completed, and continuous collection of the image information of the plurality of tabs of the first electrode assembly can be ensured when the count does not reach a preset value, thereby improving the detection efficiency of tabs.

Optionally, after it is determined that the first tab reaches the second position, the method 300 further includes: S305: Reset the count of the second electrode assembly to zero.

wherein the first tab is a first tab of the first electrode assembly, and the second electrode assembly is the electrode assembly that enters the tab detection area and is detected before the first electrode assembly.

Specifically, after the detection of a plurality of tabs of one electrode assembly X1 is complete, the count of tabs of the electrode assembly X1 is reset to zero when the first tab of the next electrode assembly X2 reaches the start position of the image collection area.

In this embodiment, by resetting the count to zero, that is, when a tab of an electrode assembly starts to be detected, the count of tabs of the previously detected electrode assembly is reset to zero, the accuracy of tab counting of the currently detected electrode assembly can be ensured, so that detection errors, such as data identification error, caused by counting error can be avoided, thereby improving accuracy and efficiency of the tab detection.

Optionally, the plurality of electrode plates enter the stacking area after passing through the image collection area, and are stacked in the stacking area. In other words, the plurality of electrode plates of the first electrode assembly are stacked in the stacking area soon after the tabs are detected, without any transfer or conveying process.

In this embodiment, the electrode plates after tab detection being directly stacked without going through additional transfer or conveying process, so that the risk of being folded or damaged due to movement of the tabs after detection can be avoided, and influence of poor state of the tabs on the detection result can be avoided, thereby effectively improving the accuracy of the tab detection result. In addition, it also helps to improve the quality of battery cells composed of electrode plates to which the tab detection is performed by using this method.

Optionally, as shown in FIG. 4, the image information of the plurality of tabs has been collected by at least one CCD (charge coupled device) camera.

Specifically, there may be one CCD camera, which is arranged on one side of the electrode plate 401, collecting image information of the negative tab 40 or the positive tab 41 of the electrode plate 401; or, there may be two CCD cameras, they are symmetrically arranged on both sides of the electrode plate 401, and respectively collecting image information of the negative tab 40 and the positive tab 41 of the electrode plate 401. There may be more than two CCD cameras, they are arranged on both sides of the electrode plate 401 and other positions, collecting image information of the negative tab 40, the positive tab 41 of the electrode plate 401 and other positions of the electrode plate 401.

When the image information is collected by the CCD camera, the process of determining that the first tab reaches the first position may be achieved by using an auxiliary shooting shaft of the CCD camera. For example, when the first tab reaches the second position, a rotation angle of the auxiliary shooting shaft of the CCD camera is reset to zero, and when the auxiliary shooting shaft of the CCD camera rotates by a preset angle, the distance corresponding to the preset angle is L1. It should be understood that, the auxiliary shooting shaft of the CCD camera is a virtual shaft, and the process of determining the first tab reaches the first position can also be achieved through other position sensing mechanisms or distance sensing mechanisms.

In this embodiment, by collecting the image information of tabs through the CCD camera, which is able to perform high-speed and continuous shooting on the tabs that continuously pass through the image collection area, in this way, efficiency and quality of tab detection can be ensured.

Optionally, when the first tab reaches the first position, the center of the first tab coincides with the center of the field of view of the CCD camera.

It should be understood that the center of the first tab refers to the geometric center of the first tab, and when the center of the first tab coincides with the center of the field of view of the CCD camera, the first tab is completely covered by the field of view of the CCD camera. The field of view of the CCD camera is the image collection area S1 mentioned above.

In this embodiment, by setting the first position as the center of the field of view of the CCD camera, compared with other positions that deviate from the center of the field of view, it is ensured that the first tab is fully covered by the field of view of the camera while the clarity of the image information can be improved. Thus, the completeness and clarity of the image information of tabs can be further improved, and the quality of tab detection can be improved.

Figure 7:
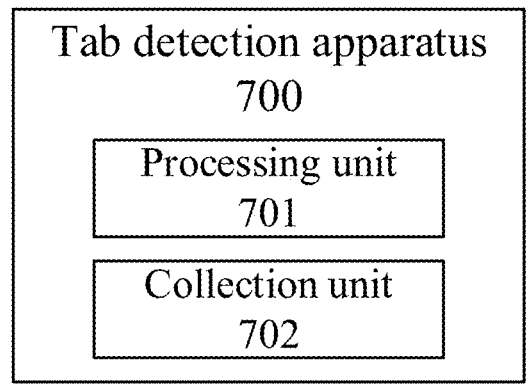
FIG. 7 is a schematic structural diagram of a tab detection apparatus according to the present application.

The present application further provides a tab detection apparatus. FIG. 7 is a schematic structural diagram of a tab detection apparatus 700 according to an embodiment of the present application.

As shown in FIG. 7, the tab detection apparatus 700 includes a processing unit 701 and a collection unit 702. The processing unit 701 is configured to determine that a first tab of a first electrode plate in a plurality of electrode plates of a first electrode assembly reaches a first position in an image collection area.

wherein the plurality of electrode plates move toward the image collection area along a vertical direction, and the image information of the first tab is used to determine a state of the first tab.

Figure 8:
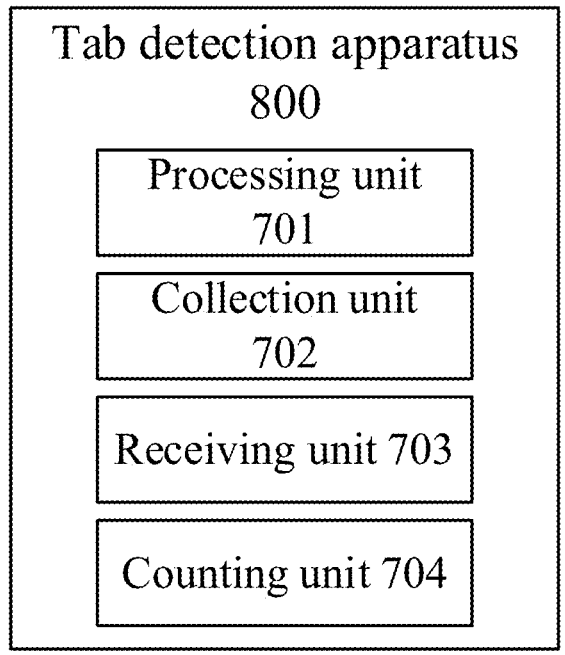
FIG. 8 is another schematic structural diagram of a tab detection apparatus according to the present application.

FIG. 8 is a schematic structural diagram of another tab detection apparatus 800 according to the present application.

Optionally, as shown in FIG. 8, the apparatus 800 further includes a receiving unit 703. The receiving unit 703 is configured to receive detection results of the plurality of tabs of the first electrode assembly after all image information of the plurality of tabs of the first electrode assembly has been collected.

Optionally, the processing unit 701 is further configured to determine that the first tab reaches the second position, the second position being a start position of the image collection area in the vertical direction; and determine that the first tab reaches the first position when the first tab moves by a first distance along the vertical direction after reaching the second position.

Optionally, the plurality of electrode plates move toward the image collection area along a vertical direction after passing through a first sensing mechanism, the processing unit 701 is further configured to determine that the first tab passes through the first sensing mechanism; and determine that the first tab reaches the second position when the first tab moves by a second distance along the vertical direction after passing through the first sensing mechanism.

Optionally, as shown in FIG. 8, the apparatus 700 further includes a counting unit 704. The counting unit 704 is configured to count the tabs passing through the first position. In this case, the processing unit 701 is further configured to determine that all image information of the plurality of tabs has been collected when the number of the tabs that pass through the first position is equal to the number of the plurality of tabs.

Optionally, after it is determined that the first tab reaches the second position, the counting unit 704 is further configured to reset the count of tabs of a second electrode assembly to zero, where the first tab is a first tab of the first electrode assembly, and the second electrode assembly is the electrode assembly detected before the first electrode assembly.

Optionally, the plurality of electrode plates enter the stacking area after passing through the image collection area, and are stacked in the stacking area.

Optionally, the collection unit 702 includes at least one CCD camera.

Optionally, when the first tab reaches the first position, the center of the first tab coincides with the center of the field of view of the CCD camera.

It should be understood that the corresponding operations in the method 300 can be tab implemented by the detection apparatus 700 and the tab detection apparatus 800. Correspondingly, same technical effects as the method 300 described above can be achieved, and details are not described herein again.

Figure 9:
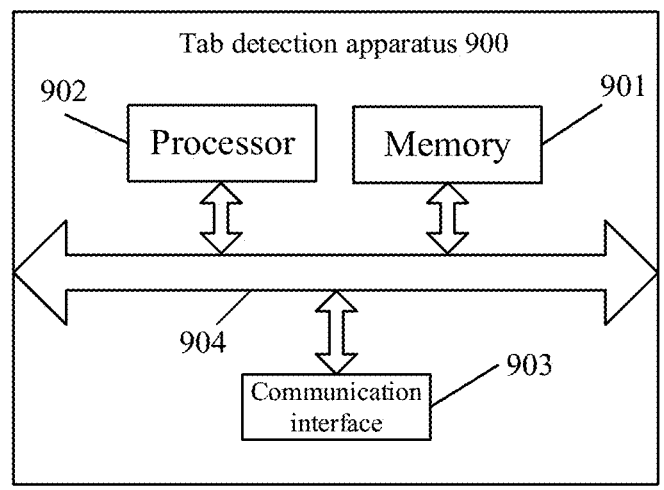
FIG. 9 is a schematic hardware structural diagram of a tab detection apparatus according to the present application.

FIG. 9 is a schematic hardware structural diagram of a tab detection apparatus 900 according to the embodiment of the present application. The apparatus 900 includes a memory 901, a processor 902, a communication interface 903, and a bus 904. The memory 901, processor 902, and communication interface 903 are communicatively connected with each other through the bus 904.

The memory 901 may be a read-only memory (ROM), a static storage device, and a random access memory (RAM). The memory 901 may store a program. When a program stored in the memory 901 is executed by the processor 902, the processor 902 and the communication interface 903 are used to execute steps of the tab detection method according to the embodiments of the present application.

The processor 902 may be a general-purpose central processing unit (CPU), a microprocessor, an application specific integrated circuit (ASIC), a graphics processing unit (GPU), or one or more integrated circuits that is configured to execute relevant programs, so as to implement functions required by the units in the apparatus of the embodiments of the present application, or perform the tab detection method of the embodiments of the present application.

The processor 902 may also be an integrated circuit chip with signal processing capability. In an implementation process, various steps of the tab detection method according to embodiments of the present application may be accomplished by using an integrated logic circuit of hardware or instructions in the form of software in the processor 902.

The processor 902 may also be a general-purpose processor, a digital signal processor (DSP), an ASIC, a field programmable gate array (FPGA) or other programmable logic device, a discrete gate or transistor logic device, or a discrete hardware component. Which is able to implement or perform the methods, steps, and logical block diagrams disclosed in the embodiments of the present application. The general-purpose processor may be a microprocessor or the processor may be any conventional processor or the like. The steps of the method disclosed with reference to the embodiments of the present application may be directly implemented by a hardware processor, or implemented by a combination of hardware and software modules in the processor. The software module may be stored in a mature storage medium in the field such as random access memory, flash memory, read-only memory, programmable read-only memory, or electrically erasable programmable memory, register, etc. The storage medium is located in the memory 901, and the processor 902 reads information in the memory 901, and completes, in combination with the hardware thereof, functions that needs to be performed by the units included in the apparatus 900 in the embodiments of the present application, or performs the tab detection method in the embodiments of the present application.

The communication interface 903 uses, for example, but not limited to, a transceiving apparatus such as a transceiver, to implement communication between the apparatus 900 and other device or communication networks.

The bus 904 may include pathways for transmitting information between various components of the apparatus 900 (e.g., the memory 901, the processor 902, the communication interface 903).

It should be noted that although the foregoing apparatus 900 merely shows a memory, a processor, and a communication interface, in a specific implementation process, a person skilled in the art should understand that the apparatus 900 may further include hardware devices for implementing other additional functions. In addition, a person skilled in the art should understand that the apparatus 900 may only include components necessary to implement the embodiments of the present application, and does not necessarily include all the components shown in FIG. 9.

While the present application has been described with reference to the preferred embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A tab detection method, comprising:
    determining that a first tab of a first electrode plate in a plurality of electrode plates of a first electrode assembly reaches a first position in an image collection area, where the plurality of electrode plates are arranged in a vertical direction and move toward the image collection area along the vertical direction, wherein the vertical direction is a plumb direction; and
    collecting image information of the first tab, wherein the image information of the first tab is used to determine a state of the first tab.

2. The method according to claim 1, wherein determining that the first tab of the first electrode assembly reaches the first position comprises:
    determining that the first tab reaches a second position, the second position being a start position of the image collection area in the vertical direction; and
    determining that the first tab reaches the first position when the first tab moves by a first distance along the vertical direction after reaching the second position.

3. The method according to claim 2, wherein the plurality of electrode plates move toward the image collection area along the vertical direction after passing through a first sensing mechanism, and the determining that the first tab reaches the second position comprises:
    determining that the first tab passes through the first sensing mechanism; and
    determining that the first tab reaches the second position when the first tab moves by a second distance along the vertical direction after passing through the first sensing mechanism.

4. The method according to claim 1, wherein the method further comprises:
    counting tabs that pass through the first position; and
    determining that all image information of the plurality of tabs has been collected when the number of tabs that pass through the first position is equal to the number of the plurality of tabs of the plurality of electrode plates.

5. The method according to claim 2, wherein the first tab is a first tab of the first electrode assembly; and after determining that the first tab reaches the second position, the method further comprises:
    resetting a count of tabs of a second electrode assembly to zero, where the second electrode assembly is the electrode assembly detected before the first electrode assembly.

6. The method according to claim 1, wherein the method further comprises:
    receiving detection results of the plurality of tabs of the first electrode assembly after all image information of the plurality of tabs of the first electrode assembly has been collected.

7. The method according to claim 1, wherein the plurality of electrode plates enter a stacking area after passing through the image collection area, and are stacked in the stacking area.

8. The method according to claim 1, wherein the image information of the plurality of tabs has been collected by at least one charge coupled device (CCD) camera.

9. The method according to claim 8, wherein when the first tab reaches the first position, the center of the first tab coincides with the center of the field of view of the CCD camera.

10. A tab detection apparatus, comprising:
    a processing unit, configured to determine that a first tab of a first electrode plate in a plurality of electrode plates of a first electrode assembly reaches a first position in an image collection area, where the plurality of electrode plates are arranged in a vertical direction and move toward the image collection area along the vertical direction wherein the vertical direction is a plumb direction; and
    a collection unit, configured to collect image information of the first tab, the image information of the first tab being used to determine a state of the first tab.

11. The apparatus according to claim 10, wherein the processing unit is further configured to:
    determine that the first tab reaches a second position, the second position being a start position of the image collection area in the vertical direction; and
    determine that the first tab reaches the first position when the first tab moves by a first distance along the vertical direction after reaching the second position.

12. The apparatus according to claim 11, wherein the plurality of electrode plates move toward the image collection area along the vertical direction after passing through a first sensing mechanism, and the processing unit is further configured to:
    determine that the first tab passes through the first sensing mechanism; and
    determine that the first tab reaches the second position when the first tab moves by a second distance along the vertical direction after passing through the first sensing mechanism.

13. The apparatus according to claim 10, wherein the apparatus further comprises:
   a counting unit, configured to count tabs that pass through the first position; and
   wherein the processing unit is further configured to determine that all image information of the plurality of tabs has been collected when the number of tabs that pass through the first position is equal to the number of the plurality of tabs of the plurality of electrode plates.

14. The apparatus according to claim 13, wherein
   the first tab is a first tab of the first electrode assembly; and
   after it is determined that the first tab reaches the second position, the counting unit is further configured to reset a count of tabs of a second electrode assembly to zero, where the second electrode assembly is the electrode assembly detected before the first electrode assembly.

15. The apparatus according to claim 10, wherein the apparatus further comprises:
   a receiving unit, configured to receive detection results of the plurality of tabs of the first electrode assembly after all image information of the plurality of tabs of the first electrode assembly has been collected.

16. The apparatus according to claim 10, wherein the plurality of electrode plates enter a stacking area after passing through the image collection area, and are stacked in the stacking area.

17. The apparatus according to claim 10, wherein the collection unit comprises at least one charge coupled device (CCD) camera.

18. The apparatus according to claim 17, wherein when the first tab reaches the first position, the center of the first tab coincides with the center of the field of view of the CCD camera.

* * * * *